United States Patent
Stewart et al.

(10) Patent No.: US 8,460,729 B2
(45) Date of Patent: *Jun. 11, 2013

(54) FLEXIBLE AND FLOATING EGG COOKING APPARATUS

(75) Inventors: Anna M Stewart, Naples, NY (US); Stephen Kraigh Stewart, Naples, NY (US)

(73) Assignee: Fusionbrands Inc, Naples, NY (US)

( * ) Notice: Subject to any disclaimer, the term of this patent is extended or adjusted under 35 U.S.C. 154(b) by 154 days.

This patent is subject to a terminal disclaimer.

(21) Appl. No.: 12/784,828

(22) Filed: May 21, 2010

(65) Prior Publication Data

US 2010/0224081 A1 Sep. 9, 2010

Related U.S. Application Data

(63) Continuation of application No. 11/530,732, filed on Sep. 11, 2006, now Pat. No. 7,754,261, which is a continuation-in-part of application No. 29/255,628, filed on Mar. 11, 2006, now Pat. No. Des. 556,501.

(51) Int. Cl.
*A23B 5/00* (2006.01)
*A23C 3/00* (2006.01)

(52) U.S. Cl.
USPC .......................................... 426/300; 426/523

(58) Field of Classification Search
USPC ................... 99/405, 403, 404, 336, 440, 441, 99/426, 427; 220/574, 574.1, 573.1, 4.24, 220/4.25, 912, 560; D7/312, 602; 426/300, 426/298, 520, 523
See application file for complete search history.

(56) References Cited

U.S. PATENT DOCUMENTS

| 2,404,130 | A | | 7/1946 | Frank | |
|---|---|---|---|---|---|
| D170,788 | S | * | 11/1953 | Zeisel | D7/586 |
| 2,689,516 | A | * | 9/1954 | Harrison | 99/336 |
| D180,329 | S | * | 5/1957 | Highberge | D7/587 |
| 3,757,674 | A | * | 9/1973 | Carroll | 99/440 |
| 4,617,860 | A | * | 10/1986 | Blaylock | 99/415 |
| 5,699,721 | A | * | 12/1997 | Funke | 99/336 |
| 6,382,455 | B1 | * | 5/2002 | Chen | 220/574 |
| D473,754 | S | * | 4/2003 | Thun | D7/545 |
| 6,591,738 | B2 | * | 7/2003 | Gabriel | 99/336 |
| 6,688,485 | B1 | * | 2/2004 | Lauer et al. | 220/574 |
| D493,671 | S | * | 8/2004 | Lebowitz | D7/583 |
| 7,419,071 | B2 | * | 9/2008 | Lion | 220/771 |
| 7,754,261 | B2 | | 7/2010 | Stewart | |
| 2005/0211101 | A1 | | 9/2005 | Finnie, II | |
| 2008/0295706 | A1 | * | 12/2008 | Cohn | 99/416 |

FOREIGN PATENT DOCUMENTS

DE 8906235 U1 9/1990
DE 202004013103 U1 10/2004
EP 1566125 A1 8/2005

(Continued)

OTHER PUBLICATIONS

Extended Search Report from the EPO mailed on Jan. 22, 2010.

*Primary Examiner* — Reginald L Alexander
(74) *Attorney, Agent, or Firm* — Smith Risley Tempel Santos LLC; Gregory Scott Smith

(57) ABSTRACT

A multi-purpose device for holding food items for cooking, storage and other purposes is disclosed. One use of the device is for the poaching of one or more eggs. The device is formed and dimensioned to float in boiling water without tipping over and spilling an egg contained within.

10 Claims, 5 Drawing Sheets

FOREIGN PATENT DOCUMENTS

| | | |
|---|---|---|
| FR | 1111647 A | 3/1956 |
| FR | 2214443 A1 | 8/1974 |
| GB | 622430 A | 5/1949 |
| GB | 1498673 A | 1/1978 |
| JP | 1281059 A | 11/1989 |
| JP | 2004 141363 A | 5/2004 |

* cited by examiner

FLEXIBLE AND FLOATING EGG COOKING APPARATUS

CROSS-REFERENCE TO RELATED APPLICATIONS

This application is a continuation of the U.S. patent application that was filed on Sep. 11, 2006, assigned Ser. No. 11/530,732 and having the title of FOOD CONTAINMENT COOKING DEVICE, which application claims priority to design application Ser. No. 29/255,638, that was filed on Mar. 11, 2006 and issued as U.S. Design Pat. No. D556501 on Dec. 4, 2007, both of these applications are incorporated herein by reference.

FIELD OF THE INVENTION

The present invention relates to the field of food containment devices for use during cooking, and more particularly to a device for poaching eggs.

BACKGROUND

Making an acceptable poached egg is a challenge for most people. One contributing factor is that poaching eggs is generally not a daily occurrence with most people. This may result in a user under-cooking or over-cooking an egg. Additionally, there is a tendency with conventional egg poachers for the egg to stick to the cooking 15 surface, yielding unacceptable results.

There are several generally accepted features for an acceptable poached egg. One feature is an egg whose whites have been cooked to set but the yolk is still partially runny. Another feature is that the egg remains intact without losing significant volume into the water. Another feature is an egg that does not stick to the cooking device, since once the egg sticks there is egg loss that occurs and the likelihood for bursting the yolk during removal is higher.

Conventional cooking devices dedicated to poaching eggs are generally bulky and require precious cabinet space for storage. Also, with conventional poaching devices the eggs generally stick to the cooking surface of the device. Some conventional poaching devices have stainless egg shaped holders that submerge in water and have a handle for removal from water. The drawback of these devices is that they have small holes in the bottom area, some of the egg is lost through these holes, plus the egg tends to stick in these holes. Recently devices for the poaching of eggs have been made of silicon. However even in the known silicone versions the holes in the bottom cause egg loss and cause some sticking as egg hardens within these holes. This may increase the cleaning time.

Many of the conventional egg poachers have only one function—to poach eggs—and have no further utility. Also many of the conventional egg poachers are designed to poach multiple eggs simultaneously. Single people, couples with different schedules, dieters, etc. may only want to poach one egg or prepare a single service portion of a food item placed into a cooking device such as a poacher. Known art related to egg poaching device includes the following.

Known art related to egg poaching devices include the following.

U.S. Pat. No. 148,817, issued to Fowler on Mar. 24, 1874, discloses an apparatus for poaching eggs.

U.S. Pat. No. 451,166, issued to Bryant on Apr. 28, 1891, discloses a device whereby eggs may be boiled or poached after breaking them into suitable receptacles.

U.S. Pat. No. 864,369, issued to Graham on Aug. 27, 1907, discloses an egg poaching pan which prevents the separation of the white of an egg during the poaching operation and from which a poached egg can be quickly and easily removed and placed upon toast or other article without breaking the egg.

U.S. Pat. No. 1,455,780, issued to Corwin on May 22, 1923, discloses a cooking utensil for isolating articles for simultaneous cooking.

U.S. Pat. No. D157,803, issued to Ulmer on Mar. 21, 1950, illustrates an egg poacher for poaching one or two eggs.

U.S. Pat. No. 3,369,480, issued to Dreyfus on Feb. 20, 1968, discloses an egg cooking and serving vessel suitable for cooking and serving a single egg.

U.S. Pat. No. 3,831,508, issued to Wallard on Aug. 27, 1974, discloses an egg cooker in which an egg can be conformed to a predetermined shape in a rack for use in a toaster, an oven or in boiling water.

U.S. Pat. No. 4,280,032, issued to Levinson on Jul. 21, 1981, discloses a microwave-reflective first container, designed to preclude microwave exposure of the sides and bottom and limit exposure to the top of a shelled, raw egg contained therein, is covered by a microwave-permeable lid and nested within a microwave-permeable second container so that the bottom and lower sides of said first container are in physical contact with a microwave-lossy liquid contained therein. Also, disclosed are temperature monitoring, a spoon shape to said first container's bottom, restricting the ability of said first container to rotate and methods of using said apparatus to soft and hard cook raw, shelled eggs from both their pre-frozen and room temperature states.

U.S. Pat. No. D352,206, issued to Davis on Nov. 8, 1994, illustrates an egg poacher for one or two eggs.

U.S. Pat. No. D363,636, issued to Leung on Oct. 31, 1995, illustrates an egg poacher for one or two eggs.

U.S. Pat. No. D381,554, issued to Tichenor on Jul. 29, 1997, illustrates an egg poacher for poaching one, two, three or four eggs.

While these devices fulfill their respective, particular objectives and requirements, the aforementioned patents do not utilize or disclose a egg poacher that can be used to poach a single serving, that is easy to use to get the desired egg consistency, that is multipurpose, that is easy to store, that is easy to clean, that is floatable, and that has no holes in the cooking area.

Therefore, a need exists for a food containment cooking device with these attributes and functionalities. The food containment cooking device according to embodiments of the invention substantially departs from the conventional concepts and designs of the prior art. It can be appreciated that there exists a continuing need for a new and improved food containment cooking device which can be used commercially. In this regard, the present invention substantially fulfills these objectives.

The foregoing patents and other information reflect the state of the art of which the inventors are aware and are tendered with a view toward discharging the inventors' acknowledged duty of candor in disclosing information that may be pertinent to the patentability of the present invention. It is respectfully stipulated, however, that the foregoing patent and other information do not teach or render obvious, singly or when considered in combination, the inventors' claimed invention.

BRIEF SUMMARY

The general purpose of the present invention, which will be described subsequently in greater detail, is to provide a device that can contain food, for cooking, storage and other purposes. Generally speaking, the present invention facilitates the poaching of one or more eggs.

In an exemplary embodiment the food containment cooking device is comprised of a one piece flexible bowl like structure with an inside, an outside, a bottom and a wall proceeding from the bottom that is angled outward from the bottom. This structure forms a hollowed out space, or cavity, within the structure into which food items may be placed.

The bottom and the wall are dimensioned to facilitate floating in boiling water when a food item, such as an egg yolk and accompanying egg white, are contained within, e.g., the bottom is curved so the device rocks back and forth in boiling water and the walls are splayed outward to increase volume and stability. In a preferred embodiment the present invention is dimensioned to provide a single serving, e.g. the poaching of one egg.

In a preferred embodiment the material used to form the food containment cooking device is made from highly heat resistant silicon and has a wall thickness of 0.090 inch. In other embodiments the present invention may be made from flexible plastic.

In some embodiments the present invention may be further comprised of one or more tabs that protrude upward from the top of the wall so that a user's fingers may grasp the tabs for removing the food containment cooking device from hot water.

In other embodiments the present invention may be further comprised of a foot or flat portion on the bottom most portion of the bottom surface of the food containment cooking device so that the device may rest in an upright position on a counter or in the microwave.

In other embodiments the present invention may be further comprised of one or more holes at the top of the wall. In embodiments having tabs, the holes may be disposed therein. The holes may be used for the placement of retail tags, for hanging on a hook, to assist in the removal of the device from hot water.

In another embodiment three or more of the present invention may be connected or formed together in an arrangement that maintains the floating feature while allowing the cooking of more than one serving of a food item.

When the present invention is in a substantially upright position it facilitates the holding of food items such as eggs, rice, cake batter, flan, frozen desserts, and the like. This holding may be during cooking, e.g. the present invention is placed in a pot or pan in the oven, on the stove top, microwave. This holding may be during storage in a refrigerator or freezer.

In one embodiment the food containment cooking device made of a flexible material, e.g. high temperature resistant silicon, which is floatable and is formed in one piece to have a curved bottom and a wall that seamlessly encompasses the bottom and protrudes from the bottom upward at an obtuse angle to form a cavity and a wall top edge having a plurality of undulations. In an exemplary embodiment these undulations form three peaks and three valleys. The peaks form tabs that may or may not have a hole formed therein, depending on the embodiment. The thickness of the flexible material is preferably 0.090 inches, but may be less than that thickness, depending on the cooking characteristics desired.

In some embodiments the bottom-most portion of the bottom may be flat to give the device stability when placed on a flat surface.

The present invention departs from the prior art in several features. The ability to float is one. The ability to float without tipping over and spilling held food items during boiling is another. Another feature is the ability of the device to float and have the held food items surrounded by hot water for even, rapid cooking is another. Another feature is the prevention of egg matter being lost into the water. Another feature is that the smoothness of the surface of the device deters an egg sticking to the silicone.

Another feature of the present invention is that the wall thickness of the device may be dimensioned to achieve a 4-minute soft poach or a 6-minute firm poach.

One aspect of the present invention is that it is designed for the boiling of a food item place therein. This is accomplished by placing the device in enough water to permit floating, resulting in heat being distributed evenly around the contained food and resulting in rapid cooking. The poaching of an egg is one use of the device in boiling water. The device can also be used to mimic a double boiler for the melting of chocolate or sugar. The preparation of flan is another food that this device would be particularly helpful in making due to the inherent non-stick features of the material and that the device floats in a water bath.

Another feature of the present invention is that it is also designed for the baking of food items placed therein, as well as the microwaving of food items placed therein. The device may be used to give a unique dome shape to baked or microwaved foods. Another aspect of the present invention is that it is also designed to be used as a molding vessel. The present invention may be positioned upside down and a melted substance, e.g. melted chocolate or sugar, drizzled over the device. The device with the drizzle may then be placed in the freezer; the device may later be removed from the freezer and the drizzled substance removed from the device by peeling the device away from drizzled substance. The arched substance that remains can then be used as a stylish accent over desserts, e.g., ice cream, pies, miniature pastries, and the like. In the upright position the device may be used as a frozen dessert cup.

Another aspect of the present invention is that it may be manufactured economically.

Another aspect of the present invention is that it may be made from readily available materials.

These and other features and advantages of the present invention will be presented in more detail in the following specification of the invention and the accompanying figures, which illustrate by way of example the principles of the invention.

There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE SEVERAL VIEWS OF THE DRAWINGS

The invention, together with further advantages thereof, may best be understood by reference to the following description taken in conjunction with the accompanying drawings in which.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

Figure 1:
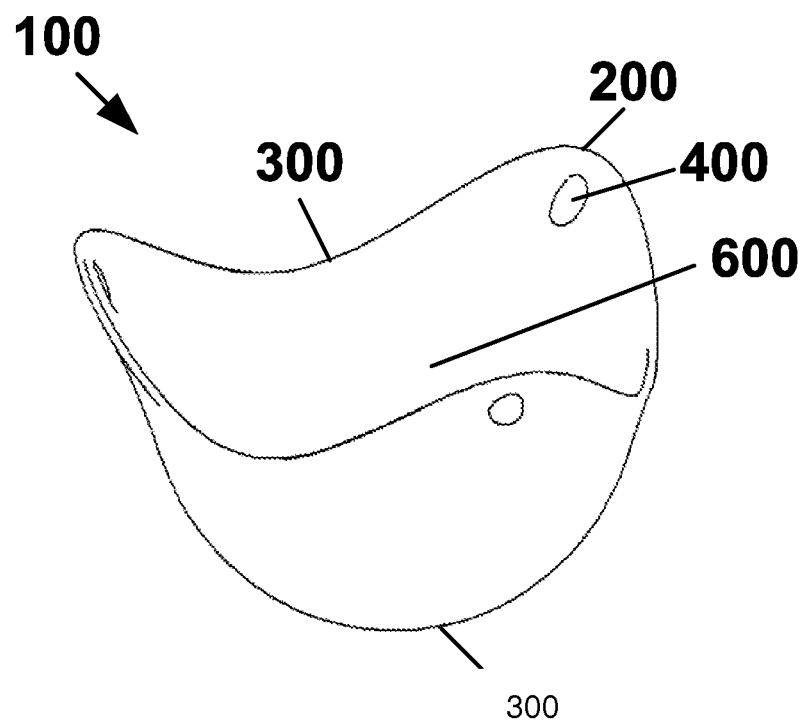
FIG. 1 illustrates a perspective view of a food containment cooking device, according to an embodiment of the present invention.
Figure 2:
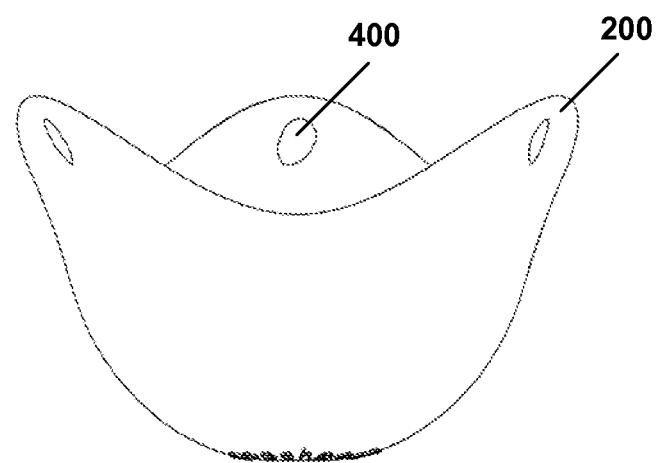
FIG. 2 illustrates a front plan view of a food containment cooking device, according to an embodiment of the present invention.
Figure 3:
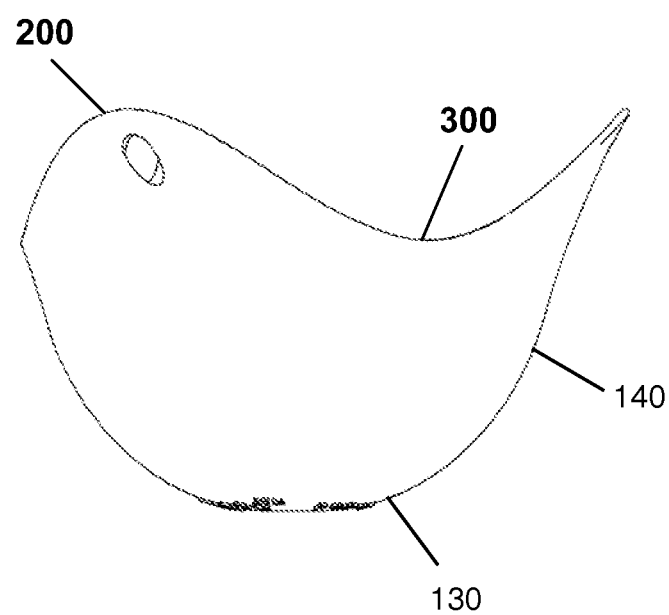
FIG. 3 illustrates a left side plan view of a food containment cooking device, according to an embodiment of the present invention.
Figure 4:
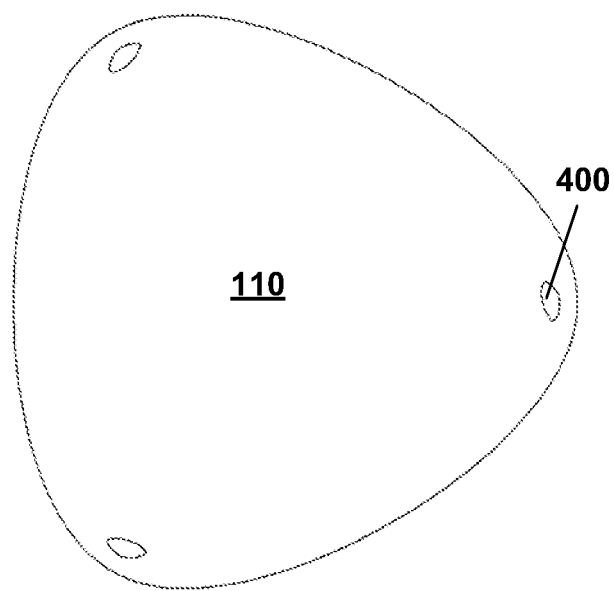
FIG. 4 illustrates a top plan view of a food containment cooking device, according to an embodiment of the present invention.
Figure 5:
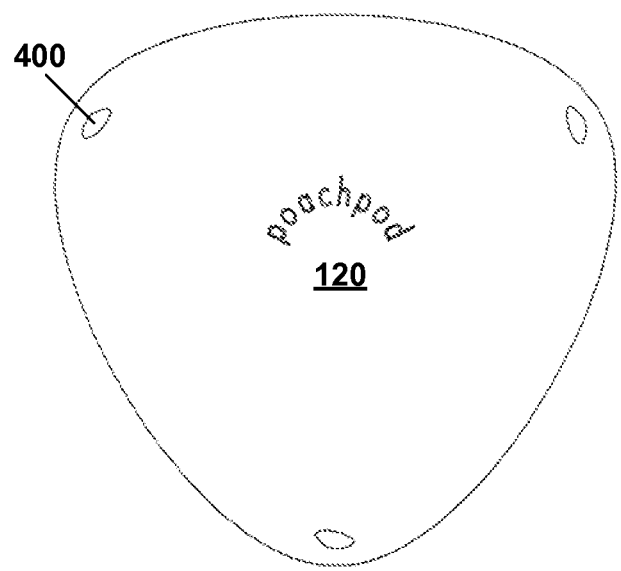
FIG. 5 illustrates a bottom plan view of a food containment cooking device, according to an embodiment of the present invention.

Referring now to FIG. 1 through FIG. 5 a food containment cooking device 100 is comprised of a bottom 130 from which a wall 140 protrudes upward at an obtuse angle and encompasses the bottom 130 forming an outside surface 120, an inside surface 110 and a cavity 600. The thickness of the wall 140 is preferably 0.090 inches or slightly thinner in order that the boiling water cooking time for an egg may be between 4 minutes and 6 minutes, based on the desired consistency of the egg yolk. In some embodiments the top of the wall 140 may be of uniform height or may have an undulating height. In one embodiment having an undulating height, the alternating peaks and valleys of the undulation form a plurality of tab 200 and valley 300.

In a preferred embodiment there are three substantially equally spaced tabs 200 separated by three substantially equally spaced valleys 300. In some embodiments, at least one of tab 200 has a tab hole 400 formed within tab 200. In other embodiments a tab hole 400 is formed with each tab 200.

In one embodiment the food containment cooking device is made as follows:
  Create a metal mold by cutting a semi circular shaped cavity that will create a thin wall thickness of 0.090 inches or thinner.
  Dimension the cavity deep enough to hold the volume of one egg.
  Fill the mold with silicone or other suitable material.
  Cure the material.
  Remove the material from the mold.

From the foregoing, it will be appreciated that, although specific embodiments of the invention have been described herein for purposes of illustration, various modifications may be made without deviating from the spirit and scope of the invention. For example, many of the features and components described above in the context of a particular food containment cooking device configuration can be incorporated into other configurations in accordance with other embodiments of the invention. Accordingly, the invention is not limited except by the appended claims.

What is claimed is:

1. A method of using a one piece food containment cooking device, which is made of a flexible material and comprises:
   a bottom, and
   a wall,
   wherein the bottom is curved and the wall seamlessly encompasses the bottom and protrudes from the bottom upward at an obtuse angle to form a cavity and a wall top edge, wherein the wall top edge is provided with one or more tabs protruding upwardly for allowing grasping for removal, and wherein the one piece food containment cooking device is used for the cooking of a food item placed within the cavity by the actions of:
   placing the food item into the cavity of the one piece food containment cooking device; and
   placing the one piece food containment cooking device with said food item contained therein in enough heated water to permit the food item contained therein to be surrounded by the hot water thereby enabling an even cooking of the food item;
   grasping one of the tabs; and
   lifting the food containment cooking device out of the heated water.

2. The method of claim 1, wherein the step of placing the food item into the cavity of the one piece food containment cooking device further comprises placing the food item into the cavity of a one piece food containment cooking device that is comprised of a flexible material that is made from a high temperature resistant silicon composition.

3. The method of claim 1, wherein the at least one of the tabs has a hole formed therein and the step of grasping one of the tabs comprising inserting a device into the hole.

4. The method of claim 1, wherein the step of placing the food item into the cavity of the one piece food containment cooking device further comprises placing the food item into the cavity of a one piece food containment cooking device that is comprised of a flexible material that is at most 0.090 inches in thickness.

5. The method claim 1, wherein the flexible material is fabricated from a material which, in conjunction with the formed shape facilitates floating of the apparatus in a liquid and the step of placing the one piece food containment cooking device with said food item contained therein in enough heated water to permit the food item contained therein to be surrounded by the hot water thereby enabling an even cooking of the food item further comprises placing the one piece food containment cooking device in enough heated water to permit floating of the one piece food containment cooking device.

6. The method of claim 1, wherein the step of placing the food item into the cavity of the one piece food containment cooking device further comprises placing the food item into the cavity of a one piece food containment cooking device that is comprised of a flexible material is fabricated at a thickness range of approximately 0.015 to 0.090 inches; and
   wherein and the food item is a raw egg; and
   leaving the one piece food containment cooking device in the heated water approximately four minutes to achieve a soft poach of the egg.

7. The method of claim 1, wherein the wall top edge has a plurality of undulations.

8. The method of claim 1, wherein the step of placing the food item into the cavity of the one piece food containment cooking device further comprises placing the food item into the cavity of a one piece food containment cooking device that is comprised of a flexible material is fabricated at a thickness range of approximately 0.015 to 0.090 inches; and
- wherein and the food item is a raw egg; and
- leaving the one piece food containment cooking device in the heated water approximately six minutes to achieve a firm poach of the egg.

9. A method of using a one piece food containment cooking device, which is made of a flexible material and comprises:
- a bottom, and
- a wall,
- wherein the bottom is curved and the wall seamlessly encompasses the bottom and protrudes from the bottom upward at an angle to form a cavity and a wall top edge configured to allow for removal of the one piece food containment cooking device optionally by use of undulations or tabs, and wherein the one piece food containment cooking device is used for the cooking of a food item placed within the cavity by the actions of:
- placing the food item into the cavity of the one piece food containment cooking device; and
- placing the one piece food containment cooking device with said food item contained therein in enough heated water to permit the food item contained therein to be surrounded by the hot water thereby enabling an even cooking of the food item; and
- utilizing the wall top edge for lifting the food containment cooking device out of the heated water.

10. A method of using a one-piece food-containment cooking device, which is made of a flexible material and comprises:
- a bottom, and
- a wall,
- wherein the bottom is curved and the wall seamlessly encompasses the bottom and protrudes from the bottom upward at an angle to form a cavity and a wall top edge configured to allow for removal of the one piece food containment cooking device, and wherein the one piece food containment cooking device is used for the cooking of a food item placed within the cavity by the actions of:
- placing the food item into the cavity of the one piece food containment cooking device; and
- placing the one piece food containment cooking device with said food item contained therein in enough heated water to permit the food item contained therein to be surrounded by the hot water thereby enabling an even cooking of the food item, wherein the shape of the food containment cooking device being such that it will remain in an upright orientation with the bottom down and the cavity opening upwards; and
- utilizing the wall top edge for lifting the food containment cooking device out of the heated water.

* * * * *